United States Patent [19]
Park et al.

[11] Patent Number: 6,042,011
[45] Date of Patent: Mar. 28, 2000

[54] SYSTEM AND METHOD FOR PRINTING AND ERROR CORRECTION OF HANGUL BARCODE

[75] Inventors: Moon Sung Park; Jea Gak Hwang; Yun Seok Nam; Jea Kwan Song; Hye Kyu Kim, all of Daejeon, Rep. of Korea

[73] Assignee: Electronics and Telecommunications Research Institute, Daejeon, Rep. of Korea

[21] Appl. No.: 09/176,030

[22] Filed: Oct. 21, 1998

[30] Foreign Application Priority Data

Jul. 7, 1998 [KR]   Rep. of Korea ............. 98-27342

[51] Int. Cl.⁷ ............................................. G06K 07/10
[52] U.S. Cl. ...................................... 235/462.01; 235/375
[58] Field of Search ..................... 235/462.01, 432.01, 235/494, 454, 375, 462.02, 461.15, 462.07

[56] References Cited

U.S. PATENT DOCUMENTS

| | | | |
|---|---|---|---|
| 4,315,245 | 2/1982 | Nakahara et al. | 340/146.3 |
| 4,317,030 | 2/1982 | Berghell et al. | 209/900 |
| 4,488,679 | 12/1984 | Bockholt et al. | 235/469 |
| 4,641,753 | 2/1987 | Tamada | 235/375 |
| 4,965,829 | 10/1990 | Lemelson | 235/375 |
| 5,189,180 | 2/1993 | Feiler | 235/375 |
| 5,216,620 | 6/1993 | Sansone | 364/478 |
| 5,237,156 | 8/1993 | Konishi et al. | 235/375 |
| 5,249,687 | 10/1993 | Rosenbaum et al. | 209/3.3 |
| 5,387,783 | 2/1995 | Mihm et al. | 235/375 |
| 5,420,403 | 5/1995 | Allum et al. | 235/375 |

OTHER PUBLICATIONS

"Mailsort Customer Barcoding Technical Specification", Issue No. 4 Apr. 1997, pp. 1–12.

*Primary Examiner*—Thien M. Le
*Attorney, Agent, or Firm*—Cohen, Pontani, Lieberman & Pavane

[57] ABSTRACT

The present invention provides a system and a method for printing and error correction of Hangul (Korean letter) barcode. A system for printing barcode in accordance with the present invention comprises a barcode generating unit for receiving data from outside and generating barcodes corresponding to the data according to a barcode reference table; a barcode reference table storage unit for storing the barcode reference table and for outputting it in response to an output demand signal; a check code generating unit for adding a control code(s) and a check code(s) to the generated barcode; a barcode image storage unit for storing images of the barcode(s) and for outputting the images corresponding to the the generated barcode, the control code(s) and the check code(s) in response to an output demand signal; and a barcode printing unit for printing the outputted images of barcode.

17 Claims, 5 Drawing Sheets

FIG. 5

| Row \ Column | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | | | | | | | | | | | | | CC0 | CC1 | CC2 | CC3 |
| 2 | 0 | 1 | 2 | 3 | 4 | 5 | 6 | 7 | 8 | 9 | | | CC4 | CC5 | CC6 | CC7 |
| 3 | 6 | 7 | 8 | 9 | A | B | C | D | E | F | G | H | CC8 | CC9 | CC10 | CC11 |
| 4 | C | D | E | F | G | H | I | J | K | L | M | N | CC12 | CC13 | CC14 | CC15 |
| 5 | I | J | K | L | M | N | O | P | Q | R | S | T | CC16 | CC17 | CC18 | CC19 |
| 6 | O | P | Q | R | S | T | U | V | W | X | Y | Z | CC20 | CC21 | CC22 | CC23 |
| 7 | U | V | W | X | Y | Z | ㄱ | ㄴ | ㄷ | ㄹ | ㅁ | ㅂ | CC24 | CC25 | CC26 | CC27 |
| 8 | ㅅ | ㅇ | ㅈ | ㅊ | ㅋ | ㅌ | ㅍ | ㅎ | ㅏ | ㅐ | ㅑ | ㅒ | CC28 | CC29 | CC30 | CC31 |
| 9 | ㅓ | ㅔ | ㅕ | ㅖ | ㅗ | ㅘ | ㅙ | ㅚ | ㅛ | ㅜ | ㅝ | ㅞ | CC32 | CC33 | CC34 | CC35 |
| 10 | ㅟ | ㅠ | ㅡ | ㅢ | ㅣ | ! | " | # | $ | % | @ | & | CC36 | CC37 | CC38 | CC39 |
| 11 | * | ( | ) | , | + | , | - | . | / | \ | < | * | CC41 | CC42 | CC43 | CC44 |
| 12 | { | } | : | ; | = | ? | [ | ] | ^ | _ | ` | ~ | CC45 | CC46 | CC47 | CC48 |
| 13 | C0 | C1 | C2 | C3 | C4 | C5 | C6 | C7 | C8 | C9 | C10 | C11 | C12 | C13 | C14 | C15 |
| 14 | C16 | C17 | C18 | C19 | C20 | C21 | C22 | C23 | C24 | C25 | C26 | C27 | C28 | C29 | C30 | C31 |
| 15 | C32 | C33 | C34 | C35 | C36 | C37 | C38 | C39 | C40 | C41 | C42 | C43 | C44 | C45 | C46 | C47 |
| 16 | C48 | C49 | C50 | C51 | C52 | C53 | C54 | C55 | C56 | C57 | C58 | C59 | C60 | C61 | C62 | C63 |

SYSTEM AND METHOD FOR PRINTING AND ERROR CORRECTION OF HANGUL BARCODE

BACKGROUND OF THE INVENTION

1. Technical Field of the Invention

The present invention relates to a barcode system, particularly relates to a system and a method for printing and error correction of Hangul(Korean letter) 4 state 4 barcode using an extended reference table.

2. Description of the Prior Art

In general, a barcode system using postal codes and delivery point codes is used for automatic mail processing. The delivery point codes are generated by using a general reference table consisting of numerals and English alphabets.

However, in Korea, most of mail information are written and handled by Hangul (Korean letter). Therefore, Hangul code is necessary to be applied to the existing bar code in order to store the delivery point information and to effectively perform automatic mail processing.

In the existing 4 state 4 bar code reference table, bar weight values, for example Track bar=0, Ascender bar=1, Descender bar=2 and Full height bar=3, are used. If a calculated barcode value is equal to or more than six(6), zero(0) is substituted for the calculated barcode value. 10 numeral and 26 English capital letters are assigned in form of 6×6 matrix.

In England Royal Mail, an extended 4 state 4 bar code reference table which extends the existing 4 state 4 bar code reference table is developed and used. Also, in Korea, it has been developed and used an 8×8 extended 4 state 4 barcode reference table which assigns combinational type Hangul to 28 extra spaces.

However, in the 8×8 extended 4 state 4 barcode reference table, since one Korean letter is represented by 2 to 5 barcodes, the length of barcode for one Korean letter is very variable, therefore, the number of Korean letters which are able to be written in a certain space is variable and very small. Also, when error detection and correction function are introduced, spaces are necessary for the error detection and correction function, then spaces for Korean letter become smaller and error correction is impossible.

SUMMARY OF THE INVENTION

Therefore, an object of the present invention is to provide a system and a method for printing Hangul (Korean letter) 4 state 4 barcode containing error check code using an extended reference table further containing Hangul codes each of which consists of two or more than two Hangul spellings.

Another object of the present invention is to provide a system and a method for for detecting and correcting an error(s) of the Hangul 4 state 4 barcode using an extended reference table.

According to the first aspect of the present invention, this object is accomplished by providing a system for printing barcode comprising: a barcode generating means for receiving data from outside and generating barcodes corresponding to the data according to a barcode reference table; a barcode reference table storage means for storing the barcode reference table and for outputting it in response to an output demand signal; a check code generating means for adding a control code(s) and a check code(s) to the generated barcode; a barcode image storage means for storing images of the barcode(s) and for outputting the images corresponding to the the generated barcode, the control code(s) and the check code(s) in response to an output demand signal; and a barcode printing means for printing the outputted images of barcode.

According to the second aspect of the present invention, this object is accomplished by providing a system for correcting an error(s) of barcodes, said system comprising: a reading means for reading barcodes; a converting means for converting the barcode and obtaining values of the barcode by applying weight value to upper value and under value of the barcodes; a detecting means for detecting location and state of an error(s) of the barcode; a correcting means for correcting the error(s) using the detected location and state of the error(s) and a barcode reference table; and a storing means for storing and outputting the barcode reference table in response to an output demand signal.

According to the third aspect of the present invention, this object is accomplished by providing a method for printing barcodes including: first step of separating input data to spellings and calculating the number of spellings; second step of generating upper values and under values corresponding to separated spellings, where the number of spellings is within an allowable maximum length; and third step of assembling and printing barcodes according to image modules.

According to the fourth aspect of the present invention, this object is accomplished by providing a method for correcting an error(s) including: first step of reading barcode and calculating indication values of upper value and under value of the barcode; second step of determining whether each indication value is respectively within a reference value of row or column; third step of determining whether a calculated check code from the indication value of the barcode is equal to the read check code; fourth step of outputting an information indicating that the barcode is a normal state if the calculated check code is equal to the read check code, and of correcting errors if not; and fifth step of replacing the indication value corresponding to an error code with a certain value if the indication value is out of the reference value at the second step.

BRIEF DESCRIPTION OF THE DRAWINGS

Other objects and aspects of the invention will become apparent from the following description of the embodiments with reference to the accompanying drawings in which:

FIG. 5 is an example of reference table of Hangul 4 state 4 barcode system which is used in the present invention.

DETAILED DESCRIPTION OF THE PREFERRED EMBODIMENTS

The embodiments of the present invention will be described with reference to the accompanying drawings.

Figure 1:
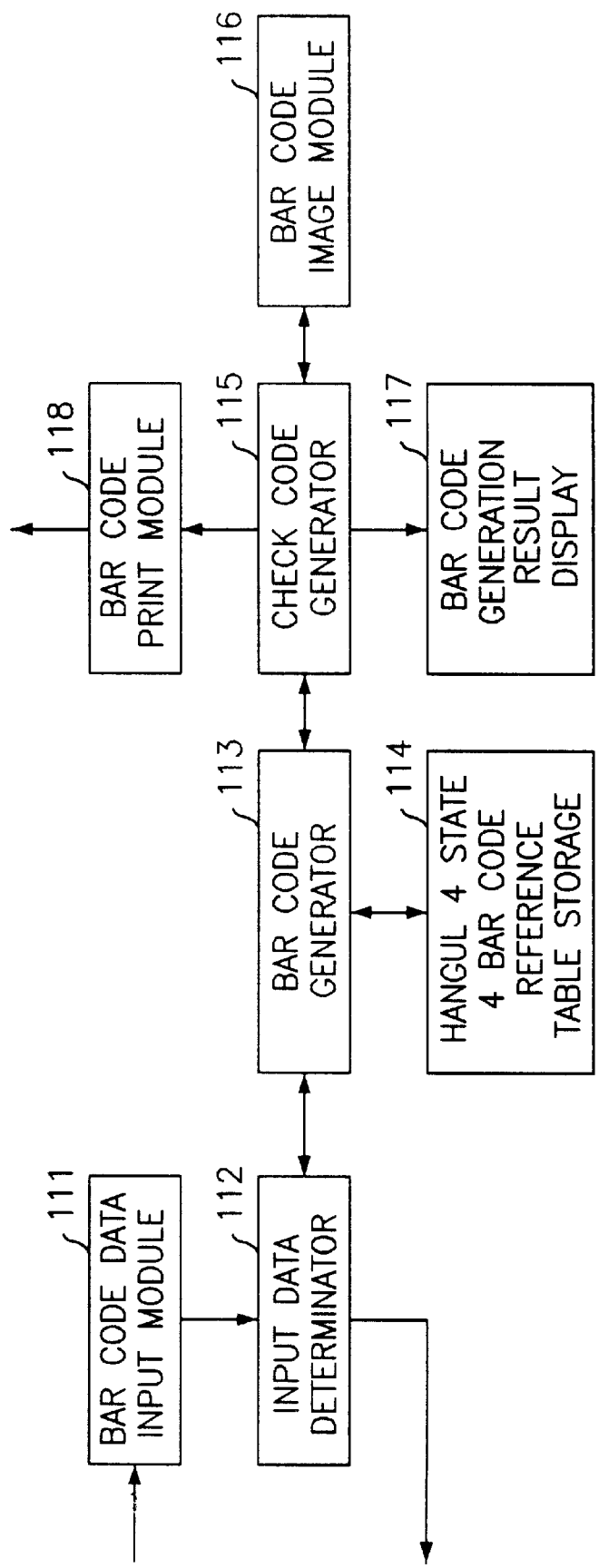
FIG. 1 is a block diagram illustrating the 4 state 4 barcode printing system in accordance with an embodiment of the present invention.

FIG. 1 shows a block diagram illustrating the 4 state 4 barcode printing system in accordance with an embodiment of the present invention.

The 4 state 4 barcode printing system comprises a data input module 111, an input data determinator 112, a barcode generator 113, a Hangul 4 state 4 barcode reference table storage 114, a check code generator 115, a barcode image module 116, and a barcode generation result display 117.

The data input module 111 receives data containing numerals, English alphabets, Korean letters (Hangul), special characters, etc through a character recognition system or a barcode application. The input data determinator 112 determines whether data from the data input module 111 can be converted to barcode data or not. If so, then the input data is transferred to the barcode generator 113. If not, then a corresponding error message is generated and transferred to an error classification system in order to be processed in it. The barcode generator 113 receives convertible Hanguls, English alphabets, numerals, etc from the input data determinator 112 and generates barcodes corresponding the input data using a Hangul 4 state 4 barcode reference table. The Hangul 4 state 4 barcode reference table is stored on the Hangul 4 state 4 barcode reference table storage 114 and outputted in response to the demand from the barcode generator 113. The check code generator 115 calculates and attaches control codes and check codes to the barcode generated in the barcode generator 113, reads barcode image corresponding to the control codes and the check codes from the barcode image module 116 and outputs them. The barcode image module 116 stores the barcode images corresponding to barcodes, check codes and control codes and outputs corresponding barcode images in response to an output demand signal. The generated barcode is displayed by the barcode generation result display 117 and printed by the barcode print module 118.

Here, the extended reference table used in the present invention is generated in form of 16×16 matrix. Weight value $2^n$(n=0, 1, 2, 3) is applied to each location of the barcodes. The reference table contains 256 elements. In the extended reference table, 10 numerals and 26 English capital letters are arranged as the same fashion as the existing reference table. In other residual areas, 26 English small letters, 28 combinational Hangul spellings and 31 special codes are arranged. In this invention, two Hangul spellings may be represented as one code.

In the other residual areas, additional special codes may be applied. Also, under the necessity, the additional codes may be used as control code for error detection and/or correction.

In this embodiment, to first apply only 144 bar codes, 12×12 areas of the reference table are used. Therefore, if calculation result value of barcode is 12, the bar code value is replaced by 0, and if the result value of barcode is more than 12, the calculation result is determined as an error.

Using the extended reference table as mentioned above, English small letters, Hangul and special codes as well as the existing barcodes may be expressed, thereby being possible to represent more various data on Hangul 4 state 4 barcode.

In the existing barcode system, one Korean letter is expressed by two(2) to five(5) spellings. However, using this table, one Korean letter may be expressed by only two or three spellings, such that more amount of Hangul can be expressed by a certain length of barcodes.

Figure 2:
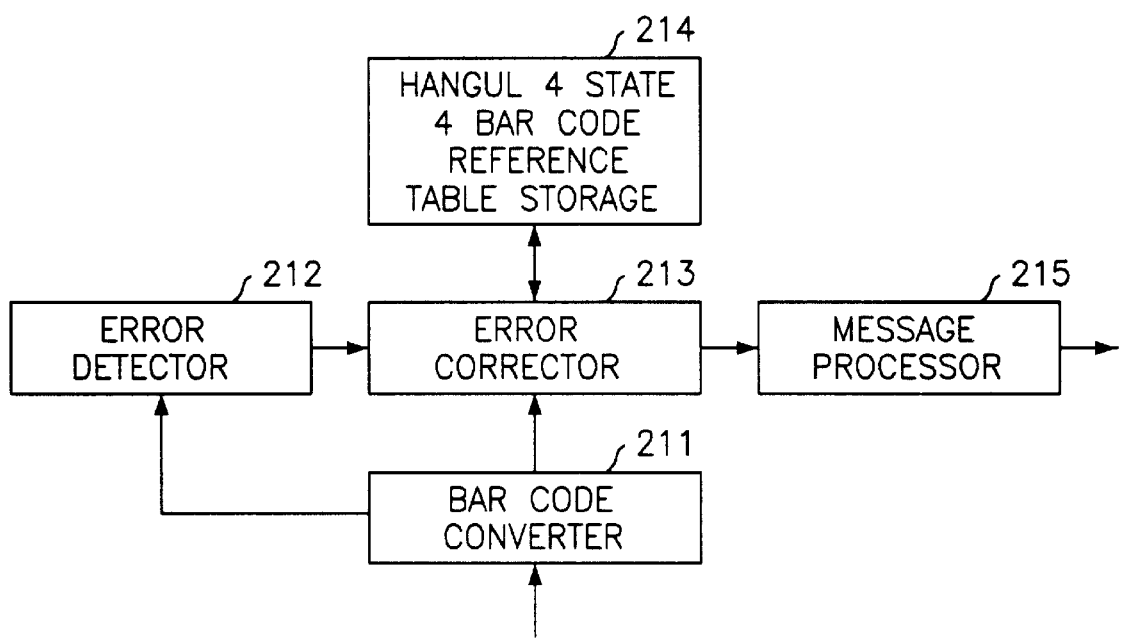
FIG. 2 is a block diagram illustrating the 4 state 4 barcode error correcting system in accordance with another embodiment of the present invention.

FIG. 2 is a block diagram illustrating the 4 state 4 barcode error correcting system in accordance with another embodiment of the present invention.

The 4 state 4 barcode error correcting system comprises a barcode converter 211, an error detector 212, an error corrector 213, a Hangul 4 state 4 barcode reference table storage and a message processor 215.

The barcode converter 211 reads barcodes of mail matter moved by a machine process and calculates a value of barcode by applying weight value to the read barcodes.

The error detector 212 receives the value of the barcode from the barcode converter 211, determines whether the value of barcode is out of the allowable limit value. If so, the error detector 212 determines whether an error occurs, then detects location and state of the error barcode.

The error corrector 213 receives location and state of the error barcode and the value of the barcode from the error detector 212 and the barcode converter 211 and corrects the error using the 4 state 4 barcode reference table. The error corrector 213 replaces the value corresponding to the error barcode from the error detector 212 with zero(0) and then corrects the error in accordance with the check codes from the barcode converter 211 by using the 4 state 4 barcode reference table. For example, the case is determined as an error that there are no first consonant or vowel. Here, the 4 state 4 barcode reference table is stored on the 4 state 4 barcode reference table storage 214.

The message processor 215 transfers the error corrected data and the normal state data which are used for classification of mail mattes to the automatic mail classification system.

Figure 3:
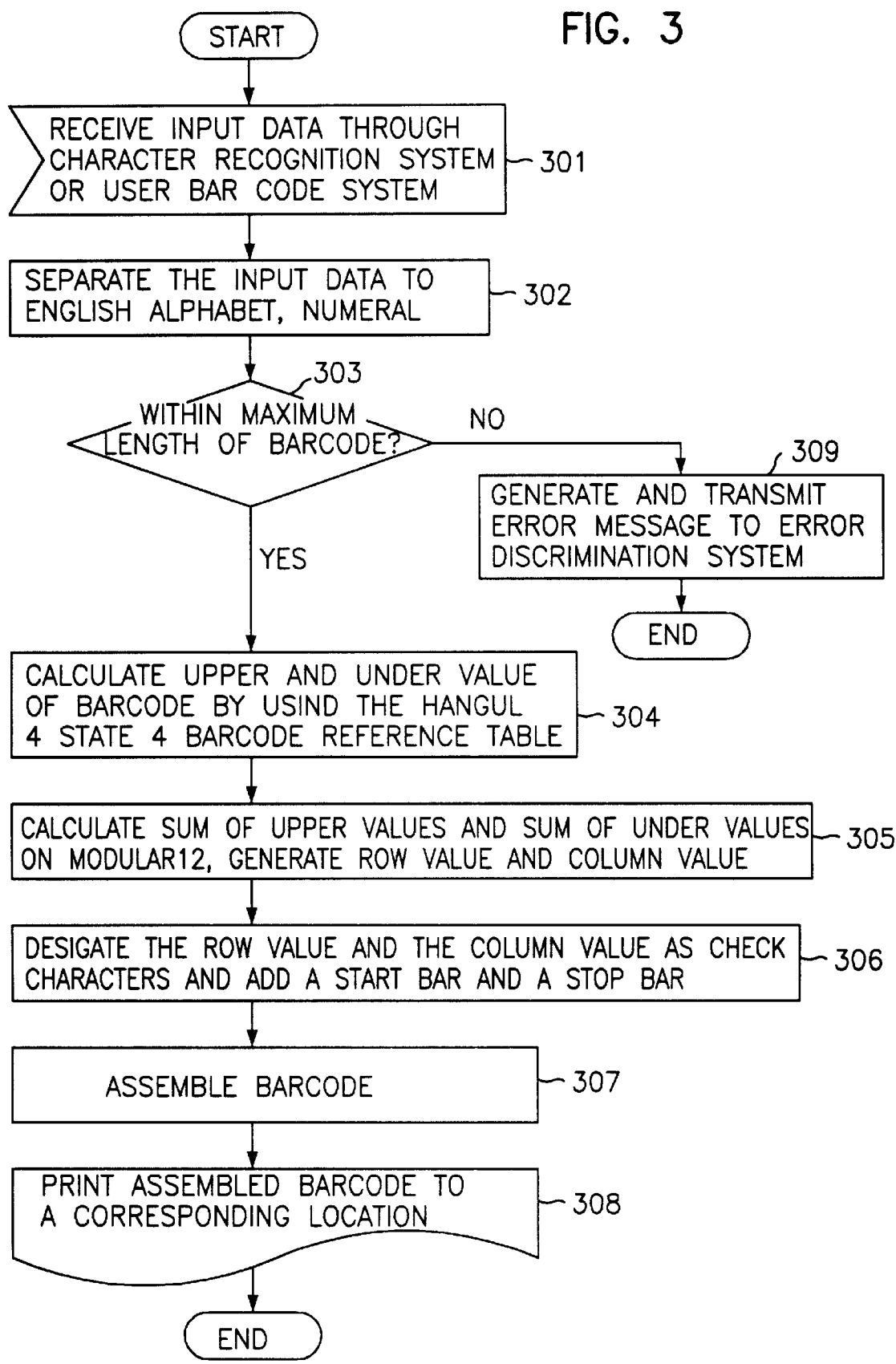
FIG. 3 is a flow chart illustrating a method for printing the 4 state 4 barcode system in accordance with another embodiment of the present invention.

FIG. 3 is a flow chart illustrating a method for printing the 4 state 4 barcode system in accordance with another embodiment of the present invention.

First, at step 301, data is inputted through the character recognition system, or the user barcode system or address database. Hangul (Korean letter) in the input data is separated to a first consonant, a vowel and last consonants. The barcode length is calculated in accordance with total number of the separated spellings at step 302. The calculated barcode length is determined to be within the maximum length of barcode. If the barcode length is within the maximum length, values of barcode are calculated with separation upper value and under value, by mapping the barcode to the Hangul 4 state 4 barcode reference table as 1:1 at step 304. Sums of the upper values and the under values of the barcode are respectively calculated on modulo 12 at step 305, and then a row value and a column value are generated, where the modular value of sums of the upper value is applied to the row of the Hangul 4 state 4 barcode reference table, and the modular value of sums of the upper value is applied to the column. Check codes are generated in accordance with the row value and the column value of the Hangul 4 state 4 barcode reference table are set as check codes, and then a start bar and a stop bar are added at step 306. Then the codes are arranged in order of the start bar, data, the check code(s) and the stop bar.

The process calls and assembles images of the Hangul 4 state 4 barcode in accordance with the arranged order at step 307 and prints the assembled barcode to a certain location of mail matter using the barcode print module 118 at step 308. Then the process ends.

Figure 4:
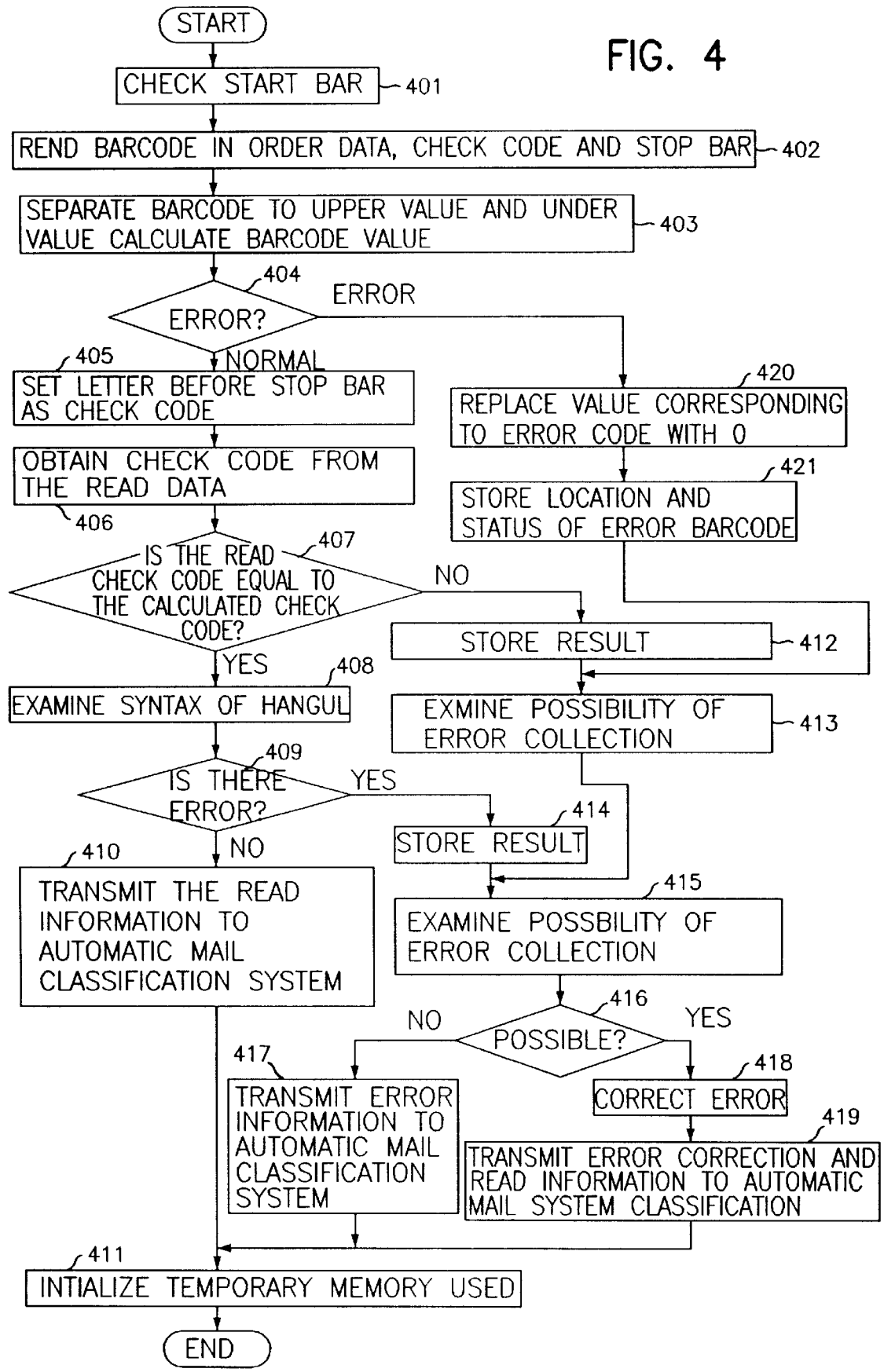
FIG. 4 is a flow chart illustrating a method for correcting an error of the 4 state 4 barcode system in accordance with still another embodiment of the present invention.

FIG. 4 is a flow chart illustrating a method for correcting an error of the 4 state 4 barcode system in accordance with still another embodiment of the present invention.

First, the process checks whether there is a start bar of input barcode at step 401, and then reads data, check code(s), a stop bar after confirmation of the start bar, at step 402.

The input barcode is separated into upper values and under values. The process determines whether the upper value and the under value of the barcode are respectively within a certain limited value (which is 12 in this embodiment). If the value is within the limited value, state of the barcode is determined as normal, and if not, state of the barcode is determined as error, at step 404.

If the barcode has no error, a code before the stop bar is set as a check code at step 405. Sums of the upper values and the under values of the input barcode on modular 12 are obtained and then check code is obtained in accordance with the modular value at step 406.

It is determined that the calculated check code is the same as the read check code at step 407. If so, process examines syntax of Hangul at step 408 and determines whether there is an error in the barcode at step 409.

If there is no error, the read barcode is determined to be normal state and transferred to the automatic mail classification system at step 410. Then the used memory is initialized at step 411 and the process ends.

If there is an error at step 409, the result is stored at step 414, then the process examines that the error can be corrected or not at step 415.

The process determines whether the error can be corrected at step 416. If so, the error is corrected by using the check code values for correcting error barcodes and the Hangul 4 state 4 barcode reference table at step 418. The error corrected barcode and the read barcode are transferred to the automatic mail classification system in order to be processed as the same as the normal mail matter at step 419. The used temporary memory is initialized at step 411, and then process ends.

Whereas if the error can not be corrected, the error message is transferred to the automatic mail classification system at step 417, the used temporary memory is initialized at step 411, and then process ends.

At step 407, the read check code is not the same as the calculated check code, the result is stored at step 412, process examines syntax of Hangul and then stores examination results at step 413. Then, the process examines that the error can be corrected by using the check code values for correcting error barcodes and the Hangul 4 state 4 barcode reference table at step 415. The process continues to step 416 as described above.

At step 404, if there is an error, the process discriminates upper characters and under characters and replace information of the error character with 0 at step 420. Then, the process stores a location value of the error barcode character and error state information of barcode and then continues to the step 413.

FIG. 5 is an example of reference table of Hangul 4 state 4 barcode system which is used in the present invention.

As illustrated in FIG. 5, the Hangul 4 state 4 barcode reference table in accordance with the present invention is generated using the weight value of 4 state 4 bar {1, 2, 4, 8}. In the reference table, 12 modulo method is adopted so that 144 barcode letters are applied. In the 144 barcode, numerals, capital English letters, special characters, 28 combinational-type Korean letters and additional 23 Korean letters are included. 50 Katagana, 50 Hiragana and control characters are applied in the residence space.

The 4 state 4 barcode system according to the present invention minimizes variation of Hagnul letters (that is, the length of spellings for expressing letters written by Hangul), represents much more Korean letters, detects and corrects errors of Hangul barcode.

Since variation of Hangul letters is under control in the present invention, customer data may be written in a certain space, the customer data is efficiently written as barcode, therefore, thereby widening automatic mail discrimination.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A system for printing barcodes comprising:

barcode generating means for receiving data from outside and generating barcodes corresponding to the data according to a barcode reference table;

barcode reference table storage means for storing the barcode reference table and for outputting it in response to an output demand signal;

check code generating means for adding control codes and check codes to the generated barcodes;

barcode image storage means for storing images of the barcodes and for outputting the images corresponding to the generated barcodes, the control codes and the check codes in response to an output demand signal; and barcode printing means for printing the outputted images of the barcodes.

2. The system for printing barcodes as claimed in claim 1, further comprising:

input means for receiving data from the outside; and determination means for determining whether the input data can be converted to barcodes, for outputting the input data to said barcode generating means if the input data is convertible, and for outputting the result to the outside if not.

3. The system for printing barcodes as claimed in claim 1, further comprising:

result displaying means for displaying images of the generated barcodes, the control codes and the check codes from said check code generating means on a displaying device.

4. The system as claimed in claim 1, wherein the barcode reference table consists of 144 elements in a 12×12 matrix.

5. The system as claimed in claim 1, wherein the barcode reference table consists of 256 elements in a 16×16 matrix.

6. The system as claimed in claim 1, wherein the barcode reference table consists of elements where two or more than two Hangul spellings may be represented as one element.

7. A system for correcting barcode errors comprising:

reading means for reading barcodes;

converting means for converting the barcodes and obtaining values of the barcodes by applying weight values to an upper value and an under value of the barcodes;

detecting means for detecting locations and states of barcode errors;

correcting means for correcting the barcode errors using the detected locations and states of the barcode errors and a barcode reference table, thereby producing error-corrected data and normal data when no barcode errors occur; and storing means for storing and outputting the barcode reference table in response to an output demand signal.

8. The system as claimed in claim 7, further comprising:

processing means for receiving the normal data from said correcting means and outputting the normal data.

9. A method for printing barcodes comprising the steps of:

a first step of separating input data to spellings and calculating the number of spellings;

a second step of generating upper values and under values corresponding to separate spellings, where the number of spellings is within an allowable maximum length; and a third step of assembling and printing barcodes according to image modules.

10. The method as claimed in claim 9, further comprising a fourth step of generating and outputting an error message to an error classification system, when the number of spellings is out of the maximum length.

11. The method as claimed in claim 10, wherein the third step comprises the steps of:

generating a check code after obtaining sums of the upper values and the under values on modular of a certain number, wherein the sum of the upper values is used for selecting a row of a 4 state 4 barcode reference table and the sum of the under values is used for a column;

attaching a start bar and a stop bar to the generated check code;

assembling barcodes by calling an image of Hangul 4 state 4 barcodes after arranging the start bar, the data, the check code and the stop bar; and printing the assembled barcodes.

12. Method for correcting errors, comprising the steps of:

a first step of reading barcodes and calculating indication values of upper values and under values of the barcodes;

a second step of determining whether each indication value is respectively within a reference value of a row or column;

a third step of determining whether a calculated check code from the indication value of the barcodes is equal to a read check code;

a fourth step of outputting information indicating that the barcode is in a normal state if the calculated check code is equal to the read check code, and of correcting errors if not; and a fifth step of replacing the indication value corresponding to an error code with a certain value if the indication value is out of the reference value at the second step.

13. The method as claimed in claim 12, wherein the third step comprises the steps of:

setting a code before a stop bar as a check code;

obtaining sums of the upper values and the under values on modular of a certain number;

calculating a check code of the indication value of the barcode from the modulo values; and determining whether the calculated check code is the same as the read check code.

14. The method as claimed in claim 12, wherein the fourth step comprises the steps of:

determining whether there is an error in barcodes;

transferring a determination result representing a normal state to an automatic mail classification system if there is no error;

storing a determination result representing an error state and examining whether the error can be corrected, if there is an error; and outputting an error message if the error can not be corrected, and outputting error corrected data and read data after correcting the error if the error can be corrected.

15. The method as claimed in claim 12, wherein the fifth step comprises the steps of:

replacing the value corresponding to the error barcode with a certain value;

storing locations and states of error barcodes;

examining whether the error can be corrected; and outputting an error message if the error can not be corrected, and outputting error corrected data and read data after correcting the error if the error can be corrected.

16. The system for printing barcodes as claimed in claim 2, further comprising:

result displaying means for displaying images of the generated barcodes, the control codes, and the check codes from said check code generating means on a displaying device.

17. The system as claimed in claim 7, further comprising:

processing means for receiving the error-corrected data from said correcting means and outputting the error-corrected data.

* * * * *